(12) United States Patent
Pan et al.

(10) Patent No.: US 11,317,204 B2
(45) Date of Patent: Apr. 26, 2022

(54) METHODS, SYSTEMS, AND COMPUTER READABLE MEDIA FOR A PHASE ARRAY DIRECTED SPEAKER

(71) Applicant: The Trustees of the University of Pennsylvania, Philadelphia, PA (US)

(72) Inventors: Jia-En Marcus Pan, Stanford, CA (US); Alfred Charles Murabito, III, Saratoga, CA (US); Daniel Dongyuel Lee, Leonia, NJ (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 0 days.

(21) Appl. No.: 16/089,959

(22) PCT Filed: Mar. 31, 2017

(86) PCT No.: PCT/US2017/025365
§ 371 (c)(1),
(2) Date: Sep. 28, 2018

(87) PCT Pub. No.: WO2017/173262
PCT Pub. Date: Oct. 5, 2017

(65) Prior Publication Data
US 2019/0124446 A1   Apr. 25, 2019

Related U.S. Application Data (60) Provisional application No. 62/316,086, filed on Mar. 31, 2016.

(51) Int. Cl.
*H04R 3/12* (2006.01)
*G10K 11/34* (2006.01)
(Continued)

(52) U.S. Cl.
CPC ............... *H04R 3/12* (2013.01); *A01M 29/16* (2013.01); *B60Q 5/006* (2013.01); *G08B 3/10* (2013.01);
(Continued)

(58) Field of Classification Search
CPC ........ H04R 3/12; H04R 1/403; H04R 29/002; H04R 2201/401; H04R 2201/403;
(Continued)

(56) References Cited

U.S. PATENT DOCUMENTS

| 7,106,180 B1 | 9/2006 | Pompei |
| 7,577,260 B1 | 8/2009 | Hooley et al. |

(Continued)

FOREIGN PATENT DOCUMENTS

EP          0898175 A1 *  2/1999   ........... G10K 11/346

OTHER PUBLICATIONS

Burka et al., "An Application of Parametric Speaker Technology to Bus-Pedestrian Collision Warning", Oct. 8-11, 2014, IEEE, 2014 IEEE 17th International Conference on Intelligent Transportation Systems (ITSC), pp. 1-6. (Year: 2014).*

(Continued)

*Primary Examiner* — Fan S Tsang
*Assistant Examiner* — Daniel R Sellers
(74) *Attorney, Agent, or Firm* — Jenkins, Wilson, Taylor & Hunt, P.A.

(57) ABSTRACT

Methods, systems, and computer readable media for a phase array directed speaker are disclosed. One system includes a phase array and a controller. The controller is configured to determine an area to send directed sound. The controller is also configured to generate input instructions for the phase array to send directed sound to the area. The input instructions indicate that at least one speaker in the phase array is to delay outputting an audio signal relative to at least one (Continued)

other speaker in the phase array. The phase array is configured to generate, using the input instructions and ultrasonic signals emitted by the speakers in the phase array, the directed sound.

16 Claims, 9 Drawing Sheets

(51) Int. Cl.
    *H04R 1/40* (2006.01)
    *H04R 29/00* (2006.01)
    *A01M 29/16* (2011.01)
    *B60Q 5/00* (2006.01)
    *G10K 15/02* (2006.01)
    *G08B 3/10* (2006.01)
    *G08G 1/16* (2006.01)

(52) U.S. Cl.
    CPC .......... *G10K 11/346* (2013.01); *G10K 15/02* (2013.01); *H04R 1/403* (2013.01); *H04R 29/002* (2013.01); *G08G 1/166* (2013.01); *H04R 2201/403* (2013.01)

(58) Field of Classification Search
    CPC ........... H04R 2203/12; H04R 2217/03; A01M 29/16; B60Q 5/006; G08B 3/10; G08G 1/166; G10K 11/346; G10K 15/02
    See application file for complete search history.

(56) References Cited

U.S. PATENT DOCUMENTS

| | | | |
|---|---|---|---|
| 7,924,160 | B1 | 4/2011 | LaPenta et al. |
| 8,786,515 | B2 | 7/2014 | Paradiso et al. |
| 2001/0007591 | A1* | 7/2001 | Pompei ............... B06B 1/0292 381/111 |
| 2002/0101360 | A1* | 8/2002 | Schrage ............... G08G 1/095 340/901 |
| 2003/0185404 | A1 | 10/2003 | Milsap |
| 2004/0264707 | A1* | 12/2004 | Yang .................... G10K 11/26 381/77 |
| 2006/0140420 | A1* | 6/2006 | Machida ............... H04H 60/04 381/116 |
| 2009/0048789 | A1* | 2/2009 | Yu ...................... G01N 29/348 702/39 |
| 2015/0018038 | A1 | 1/2015 | Na et al. |

OTHER PUBLICATIONS

Pompei, F. Joseph, "Sound From Ultrasound: The Parametric Array as an Audible Sound Source", Jun. 2002, MIT, pp. 1-132. (Year: 2002).*
Notification of Transmittal of the International Search Report and the Written Opinion of the International Searching Authority, or the Declaration for International Application No. PCT/US2017/025365 (dated Jun. 8, 2017).
"Clever Devices Pedestrian Warning System," Clever Devices, https://web.archive.org/web/20150206004010/http://www.cleverdevices.com/pedestrianwarning.htm, pp. 1-2 (Feb. 6, 2015).
"Soundlazer Project," https://web.archive.org/web/20141110162631/http://www.soundlazer.com/about-this-project/, pp. 1-3 (Nov. 10, 2014).
Altstadt, "Distracted walkers listen up and look up: Talking buses to begin running on five TriMet bus lines—TriMet News," http://news.trimet.org/2014/03/pedestrians-listen-up-and-look-up-talking-buses-to-begin-running-on-five-trimet-bus-lines-the-week-of-march-3/, pp. 1-4 (Mar. 13, 2014) (Downloaded Apr. 17, 2020).
"TriMet At-a-Glance," Tech. Rep., TriMet, 10 pages (Feb. 2014).
"Safe Turn Alert 2.0," Brochure, ProTran Technology, https://www.protrantechnology.com/bus-safety, pp. 1-2 (2014).
Greater Cleveland Regional Transit Authority, "Annual Report for the Year 2013," http://data.axmag.com/data/201403/20140313/U115884 F269429/index.html, 28 pages (2013).
Karnash et al., "8 Charged With Faking Injuries After Minor SEPTA Accident In 2009," http://philadelphia.cbslocal.com/2012/10/11/8-charged-with-faking-injuries-after-minor-septa-accident-in-2009/, pp. 1-3 (Oct. 11, 2012) (Downloaded Apr. 17, 2020).
"Sensing Danger," Brigade Electronics, https://web.archive.org/web/20160322184327/http://brigadeelectronics.com/product/ultrasonic-obstacle-detection/overview-uod/, pp. 1-3 (Mar. 22, 2016).
Schwebel et al., "Distraction and Pedestrian Safety: How Talking on the Phone, Texting, and Listening to Music Impact Crossing the Street," Accident Analysis & Prevention, pp. 1-13 (Mar. 2012).
Greater Cleveland Regional Transit Authority (GCRTA), "About RTA," http://www.riderta.com/about, pp. 1-3 (2012) (Downloaded Apr. 19, 2020).
"TriMet halts test of audible pedestrian warning system," TriMet, https://web.archive.org/web/20120104160041/http://trimet.org/news/releases/may27-pedwarning-canceled.htm, p. 1 (May 27, 2011).
"TriMet tests audible pedestrian warning system," TriMet https://web.archive.org/web/20120112103315/http://trimet.org/news/releases/mar1-audible-test.htm, p. 1 (Mar. 1, 2011).
Farkas, "RTA to install an audible system on buses to warn pedestrians at crosswalks," http://www.cleveland.com/metro/2009/10/rta_to_install_an_audible_syst.html, pp. 1-4 (Oct. 2009) (Downloaded Apr. 17, 2020).
Kramer, "That beeping and honking you hear is coming from RTA buses that are turning," http://www.cleveland.com/metro/2009/03/that_beeping_and_honking_you_a.html, pp. 1-3 (Mar. 31, 2009) (Downloaded Apr. 17, 2020).
Sims, "RTA works to reduce left-turn accidents," http://www.cleveland.com/metro/2009/01/rta_works_to_reduce_leftturn_a.html, pp. 1-3 (Jan. 5, 2009) (Downloaded Apr. 17, 2020).
Pecheux et al., "TCRP Report 125: Guidebook for Mitigating Fixed-Route Bus-and-Pedestrian Collisions," Transportation Research Board of the National Academies, 76 pages (2008).
Uchiyama et al., "Improvement in Detectability of Alarm Signals in Noisy Environments by Utilizing Spatial Cues," 2007 IEEE Workshop on Applications of Signal Processing to Audio and Acoustics, pp. 74-77 (Oct. 21-24, 2007).
Kraft, "A Quaternion-based Unscented Kalman Filter for Orientation Tracking," Proceedings of the Sixth International Conference of Information Fusion, vol. 1, pp. 47-54 (2003).
Pompei, "Sound From Ultrasound: The Parametric Array as an Audible Sound Source," Ph.D. Dissertation, Massachusetts Institute of Technology, pp. 1-132 (2002).
De Lorenzo et al., "Lights and Siren: A Review of Emergency Vehicle Warning Systems," Annals of Emergency Medicine, vol. 20, No. 12, pp. 1331-1335 (Dec. 1991).
Pompei, "The Use of Airborne Ultrasonics for Generating Audible Sound Beams," J. Audio Eng. Soc., vol. 47, No. 9., pp. 1-8 (Sep. 1999).

* cited by examiner

METHODS, SYSTEMS, AND COMPUTER READABLE MEDIA FOR A PHASE ARRAY DIRECTED SPEAKER

PRIORITY CLAIM

The present application claims the benefit of U.S. Provisional Patent Application Ser. No. 62/316,086, filed Mar. 31, 2016, the disclosure of which is incorporated herein by reference in its entirety.

TECHNICAL FIELD

The subject matter described herein relates speaker systems. More particularly, the subject matter described herein relates to methods, systems, and computer readable media for a phase array directed speaker.

BACKGROUND

Fatal bus and pedestrian collisions have been a continual headache for transit operators and agencies over many decades. Additionally, collisions have become increasingly common between buses and pedestrians, as more and more pedestrians engage in "distracted walking" while crossing streets—in other words, walking while occupied with earphones, smartphones, and other electronic devices.

Crosswalks are also dangerous places for visually impaired pedestrians. Current audio warning systems emit a 'chirp' sound to guide blind pedestrians across. However, these sounds are often too soft, and can be difficult to localize. Further, residents generally complain if the volume of such systems is too loud.

SUMMARY

Methods, systems, and computer readable media for a phase array directed speaker are disclosed. An example system for generating directed sound includes a phase array and a controller. The controller is configured to determine an area to send directed sound. The controller is also configured to generate input instructions for the phase array to send the directed sound to the area. The input instructions indicate that at least one speaker in the phase array is to delay outputting an audio signal relative to at least one other speaker in the phase array. The phase array is configured to generate, using the input instructions and ultrasonic signals emitted by the speakers in the phase array, the directed sound.

According to another example system for generating directed sound, the system includes at least one sensor, a phase array, and a controller. The at least one sensor is configured to obtain location information associated with a target. The controller is configured to receive, using the at least one sensor, the location information for the target. The controller is further configured to determine an area to send directed sound from the phase array. The controller is also configured to generate input instructions for the phase array to send the directed sound to the area. The input instructions indicate that at least one speaker in the phase array is to delay outputting an audio signal relative to at least one other speaker in the phase array. The phase array is configured to generate, using the input instructions and ultrasonic signals emitted by the speakers in the phase array, the directed sound.

According to an example method for generating directed sound, the method includes determining an area to send directed sound. The method also includes generating input instructions for the phase array to send the directed sound to the area. The input instructions indicate that at least one speaker in the phase array is to delay outputting an audio signal relative to at least one other speaker in the phase array. The method further includes generating, using the input instructions and ultrasonic signals emitted by the speakers in the phase array, the directed sound using the phase array.

According to another example method for generating directed sound, the method includes receiving, using at least one sensor, location information associated with a target. The method further includes determining, using the location information, an area to send directed sound. The method also includes generating input instructions for the phase array to send the directed sound to the area. The input instructions indicate that at least one speaker in the phase array is to delay outputting an audio signal relative to at least one other speaker in the phase array. The method further includes generating, using the input instructions and ultrasonic signals emitted by the speakers in the phase array, the directed sound using the phase array.

The subject matter described herein may be implemented in hardware, software, firmware, or any combination thereof. As such, the terms "function", "node", or "module" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to generating directed sound. In accordance with some aspects of the subject matter described herein, methods, techniques, and mechanisms may be used for generating directed sound using a phase array. For example, a phase array in accordance with aspects described herein may include multiple columns of ultrasonic speakers (e.g., transducers) that can emit ultrasonic carrier signals modulated by an acoustic or audio signal, where at least one column of speakers in the phase can delay emitting an audio signal relative to when an adjacent column of speakers in the phase array emits the same audio signal. In this example, by changing the delay between speaker columns and using ultrasonic carrier signals, sound may be electronically steered or directed towards an arbitrary direction, e.g., by shifting an audio signal some degrees or radians from a non-shifted or normal direction. Advantageously, by implementing a directed speaker using a phase array containing ultrasonic speakers, a sound beam or signal may be emitted that is shaped and/or directed towards a particular target (e.g., a pedestrian), thereby allowing the sound to be louder and more localized which may more effectively warn a pedestrian of danger while also minimizing noise pollution for others (e.g., other pedestrians that are not in danger).

In accordance with some aspects of the subject matter described herein, methods, techniques, and mechanisms may be used for generating directed sound using a phase array to a moving target. For example, a pedestrian warning system in accordance with aspects described herein can track a pedestrian or other moving target via a camera detection system and/or another tracking system and using information about the moving target may adjust a sound beam (e.g., an audio signal) to move with the target.

Figure 1:
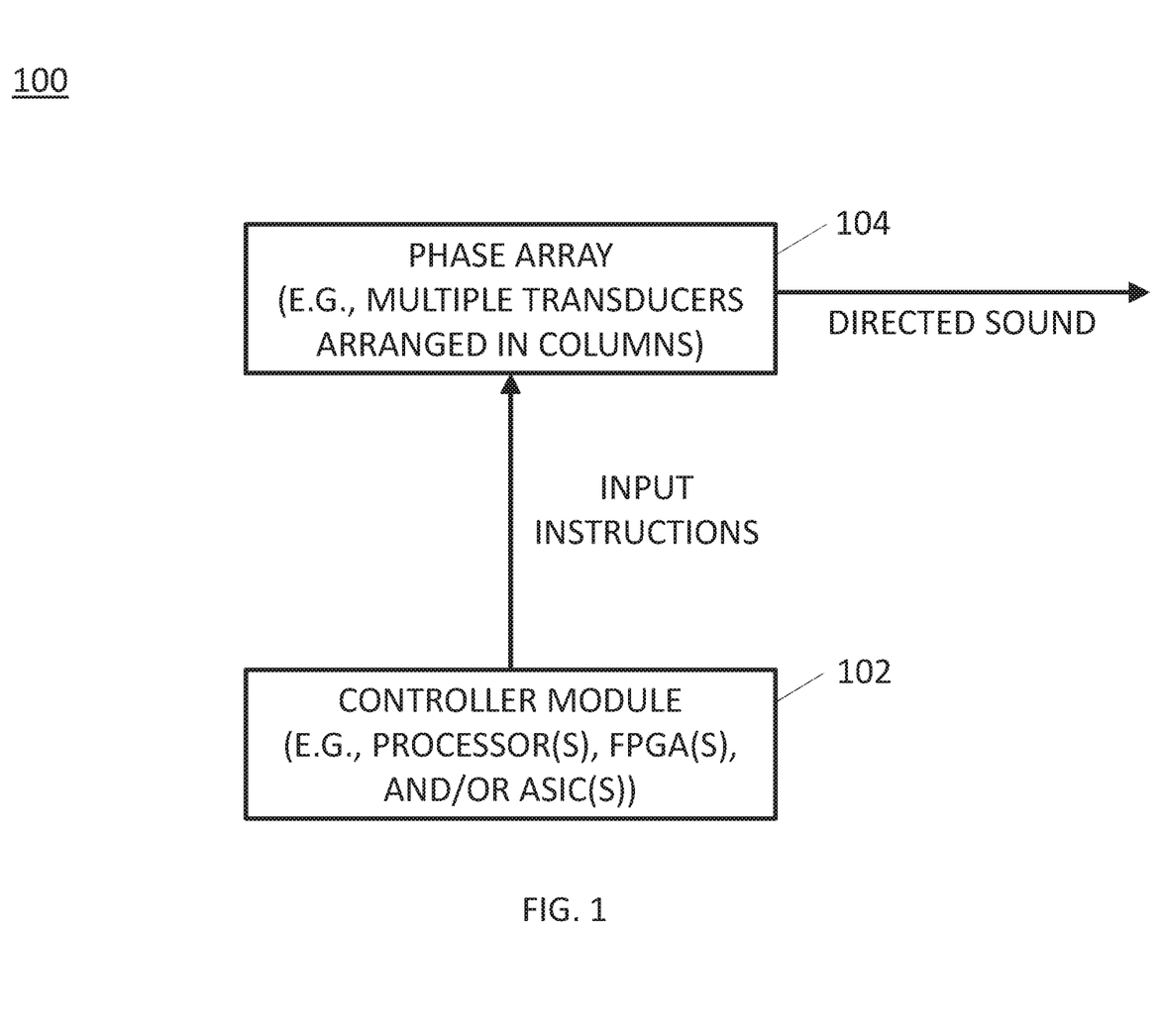
FIG. 1 is a high level block diagram illustrating a phase array directed speaker system according to an embodiment of the subject matter described herein.

FIG. 1 is a high level block diagram illustrating a phase array directed speaker system 100 according to an embodiment of the subject matter described herein. Referring to FIG. 1, system 100 may include a controller module 102 and a phase array 104. Controller module 102 may represent any suitable entity or entities (software executing on at least one processors, at least one field programmable gate array (FPGA), and/or at least one application-specific integrated circuit (ASIC)) for controlling various aspects of phase array directed speaker system 100.

In some embodiments, controller module 102 may be configured to determine an area to direct sound and may be configured to generate instructions for phase array 104. For example, controller module 102 may determine a particular location or area to receive an audio signal (e.g., a warning message or a siren) and may direct or shape the audio signal towards the location or area using phase array 104.

Phase array 104 may represent multiple speakers (e.g., transducers or emitters) for emitting sound (e.g., an audio signal). In some embodiments, speakers in phase array 104 may be aligned into multiple columns of speakers. In some embodiments, columns of speakers in phase array 104 may be spaced at an integer multiple of the emission wavelength. In some embodiments, speakers in phase array 104 may be individually addressable and/or addressable by rows and/or columns so that a same signal can be emitted from various speakers using different phase delays (e.g., time delays).

Additional details are described below and in a manuscript entitled "An Application of Parametric Speaker Technology to Bus-Pedestrian Collision Warning"; the disclosure of which is incorporated herein by reference in its entirety.

It will be appreciated that FIG. 1 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

Figure 2:
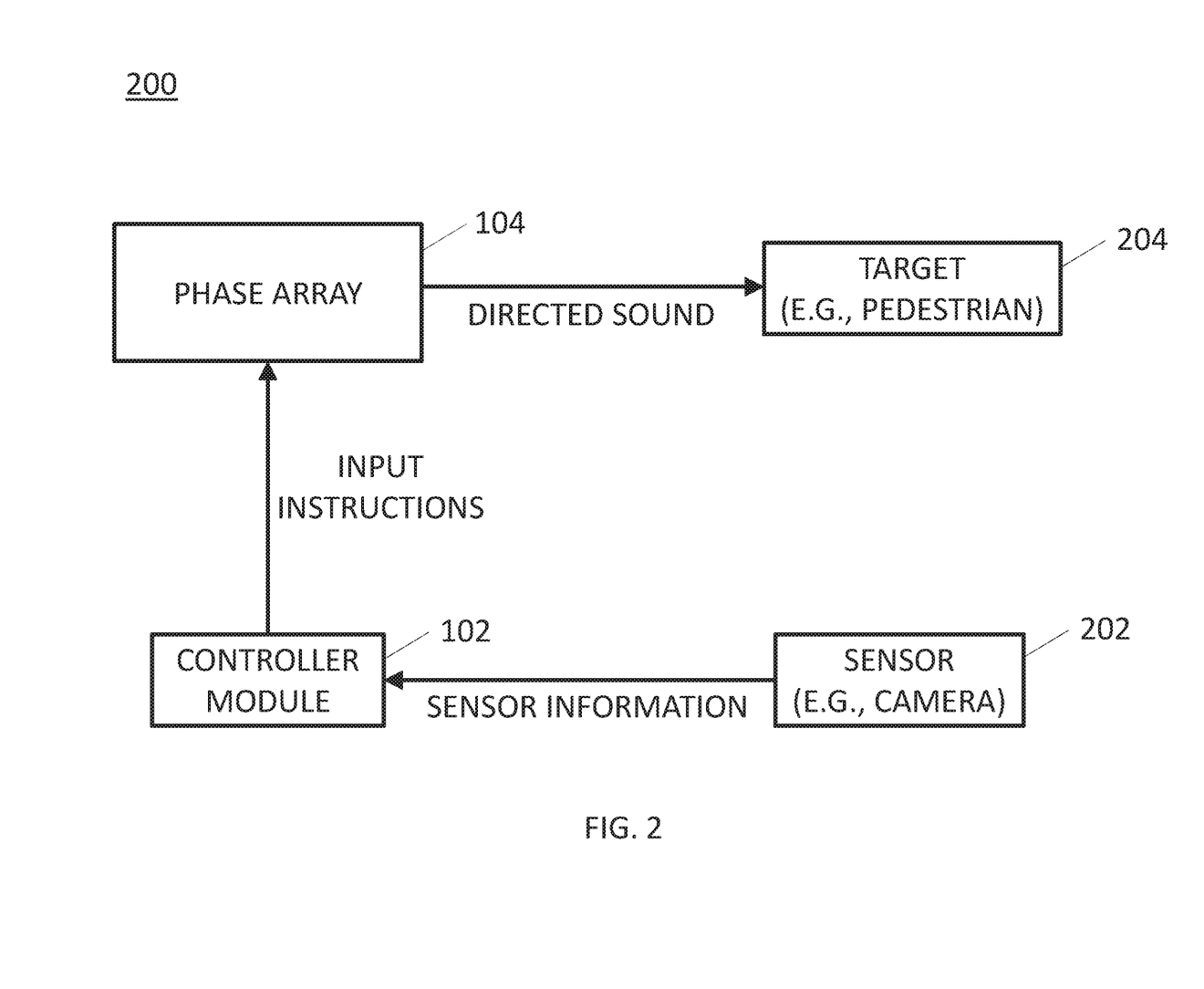
FIG. 2 is a high level block diagram illustrating a pedestrian warning system according to an embodiment of the subject matter described herein.

FIG. 2 is a high level block diagram illustrating a pedestrian warning system 200 according to an embodiment of the subject matter described herein. Referring to FIG. 2, system 200 may include at least one sensor 202, controller module 102, phase array 104, and a target 204.

Sensor 202 may represent any suitable entity or entities for obtaining location information associated with target 204. Some examples of sensor 202 may include a camera, a computer vision system, a laser rangefinder system, or a sonar detection system. For example, sensor 202 may include a camera and/or related software for tracking a pedestrian crossing a street or intersection. In this example, sensor 202 may be capable of identifying the pedestrian's location, direction of movement, and/or speed of movement. In some embodiments, sensor 202 may be capable of monitoring and tracking multiple targets. Sensor 202 may provide location information and/or other relevant data to controller module 102 for further processing.

In some embodiments, controller module 102 may be configured to receive information about target 204 from sensor 202 and may use this information when determining an area to send directed sound. In some embodiments, controller module 102 may receive updated information about target 204 as target 204 moves and may adjust input instructions for phase array 104 such that an audio signal moves with target 204. For example, controller module 102 may request location information about target 204 from sensor 202 every half second and, if necessary, may adjust time delays associated with columns of speakers in phase array 104 to adjust where the sound is being directed so that the sound reaches target 204 as he moves.

It will be appreciated that FIG. 2 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

Figure 3:
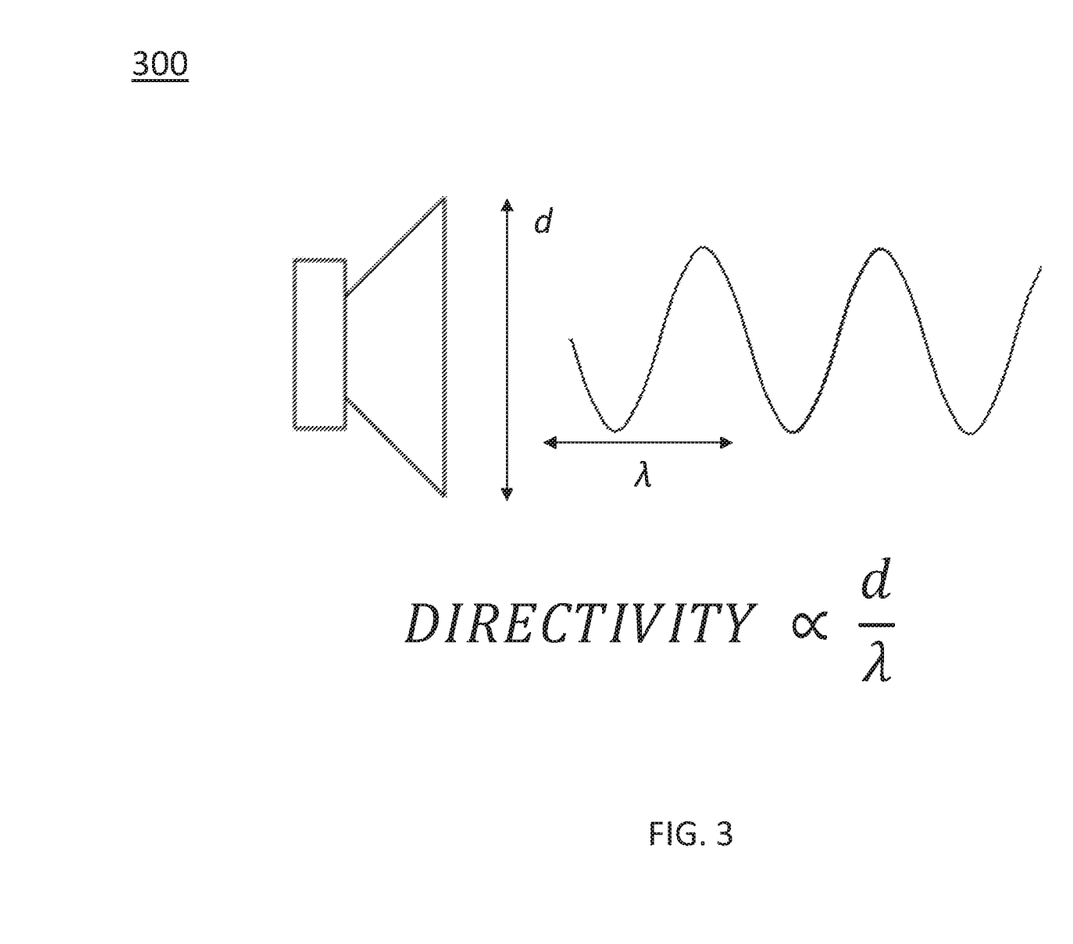
FIG. 3 is a diagram illustrating sound related characteristics affecting directivity according to an embodiment of the subject matter described herein.

FIG. 3 is a diagram illustrating sound related characteristics 300 affecting directivity according to an embodiment of the subject matter described herein. As depicted in FIG. 3, directivity is proportional to the diameter of a transducer (e.g., an emitter or speaker in phase array 104) divided by a wavelength of an emitted audio signal. For example, a high frequency signal (e.g., an ultrasonic or a 40 kilohertz (kHz) or greater signal) may have a relatively short wavelength but have a relatively high directivity, e.g., compared to lower frequency signals, such as a 5 kHz signal.

Figure 4:
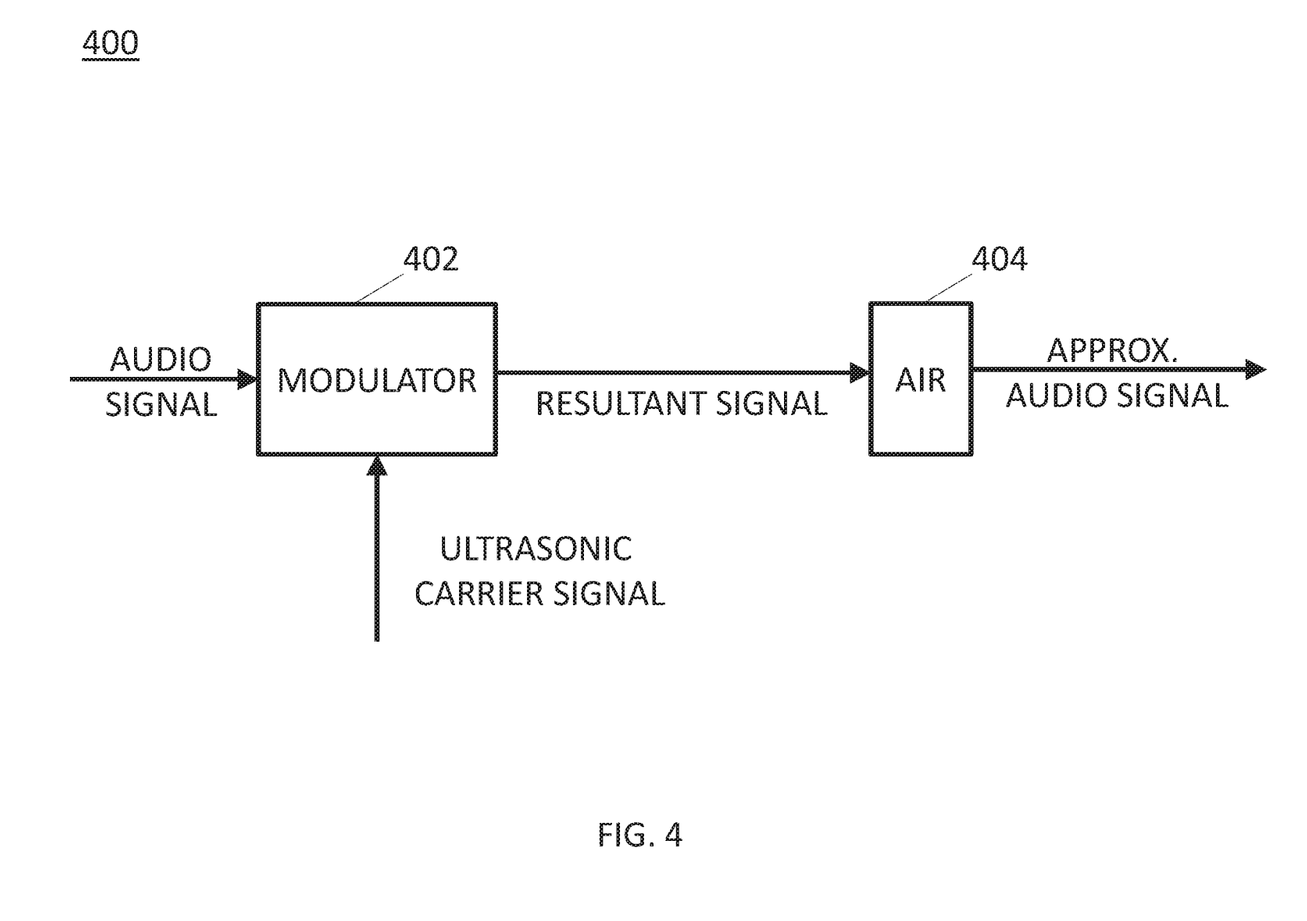
FIG. 4 is a high level block diagram illustrating generating an audio signal using an ultrasonic carrier signal according to an embodiment of the subject matter described herein.

FIG. 4 is a high level block diagram illustrating generating an audio signal using an ultrasonic carrier signal according to an embodiment of the subject matter described herein. In some embodiments, phase array 104 may include high frequency transducers (e.g., ultrasound speakers). In such embodiments, a high frequency transducer may emit a 40 kHz or higher audio signal.

In some embodiments, phase array 104 or a related system (e.g., system 100 or 200) may use the nonlinear nature of the sound propagation medium (e.g., air 404) to produce audio signals audible to humans (e.g., signals between about 20 Hz and about 20 kHz) from a high frequency carrier signal. For example, since air is a nonlinear medium, signals passing through the air are subject to non-frequency-preserving transformations, including sums and differences. In this example, phase array 104 can use a higher frequency signal (e.g., which allows for a physically smaller array since transducers in a phase array must be spaced at a distance comparable to the output frequency) and rely on the air itself to produce audible sound.

Referring to FIG. 4, modulator 402 may represent any suitable entity (e.g., a digital to analog converter, a processor, and/or a transducer) for modulating an audio signal and an ultrasonic carrier signal. For example, modulator 402 may use an audio signal (represented by $\cos(2\pi f_1 t)$) and an ultrasonic carrier signal (represented by $\cos(2\pi f_c t)$). In this example, modulator 402 may generate or produce a resultant signal (represented, in part, by $\cos(2\pi f_c t)+\frac{1}{2}\cos(2\pi(f_c+f_1)t)+\ldots$). Continuing with this example, as the resultant signal passes through air 404, nonlinearities in air pressure may reproduce an audible difference frequency (represented by $\cos(2\pi(f_c+f_1)t)$+distortion) which is approximately the original audio signal (represented by $\cos(2\pi f_1 t)$).

Figure 5:
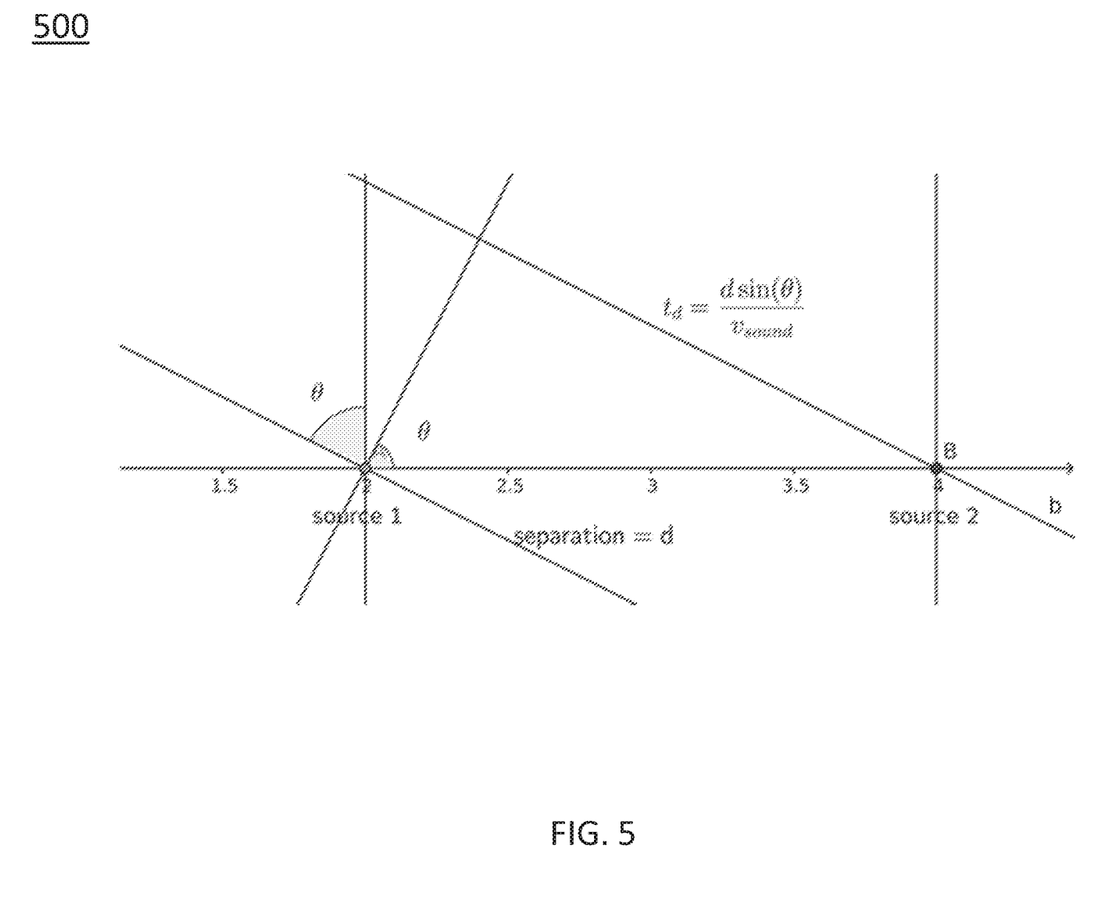
FIG. 5 is a diagram illustrating time delay between adjacent transducers in a phase array according to an embodiment of the subject matter described herein.

FIG. 5 is a diagram illustrating time delay between adjacent transducers in phase array 104 according to an embodiment of the subject matter described herein. Referring to FIG. 5, a graph 500 depicts separation between two transducers (e.g., labeled as source 1 and source 2 in graph 500) in phase array 104. As indicated in graph 500, the separation between the two transducers is usable when determining a time delay for emitting or outputting an audio signal.

In some embodiments, phase array 104 may include a two-dimensional array (e.g., columns and/or rows) of transducers (e.g., speakers) arranged in a configuration so as to electronically direct sound to a particular area. In some embodiments, each column of transducers in phase array 104 may emit the same signal, but with a programmable delay from an adjacent column. In such embodiments, by changing the delay between columns of transducers, an audio signal or sound beam may be shifted (e.g., by a number of degrees or radians) from a normal or non-shifted position.

In some embodiments, controller module 102 and/or another entity may determine an appropriate time delay for shifting an audio signal by a particular amount using the formula depicted below.

$$t_d = \frac{d\sin(\theta)}{v_{sound}}$$

For example, using the above formula, a time delay ($t_d$) may be computed by dividing the product of the separation between adjacent transducers (d) and the sin of a particular angle or shift in radians ($\sin(\theta)$) by the velocity (e.g., about 343 meters per second) of the sound being emitted ($v_{sound}$).

Figure 6:
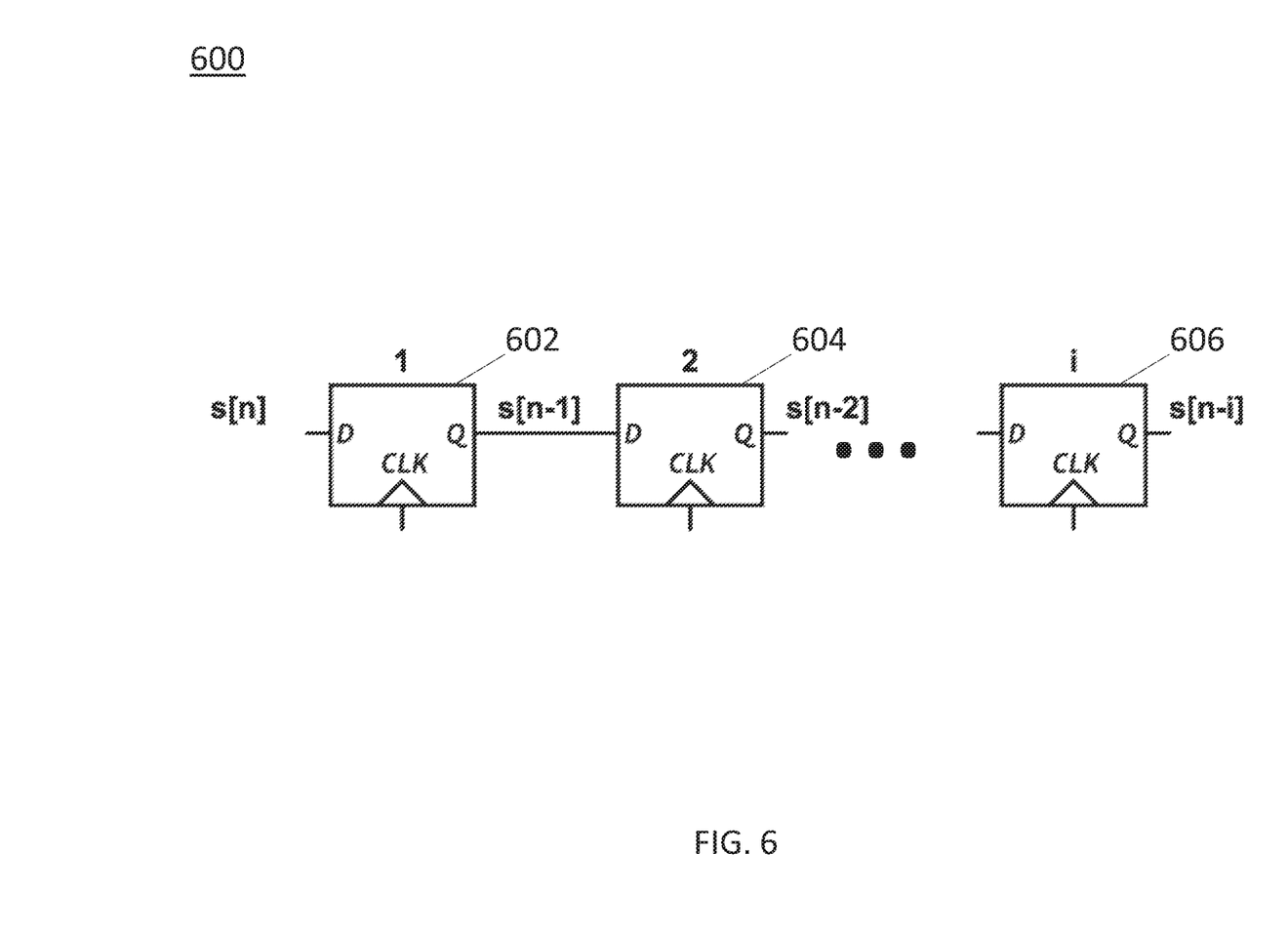
FIG. 6 is a high level block diagram illustrating time delay circuits for an audio signal according to an embodiment of the subject matter described herein.

FIG. 6 is a high level block diagram illustrating time delay circuits 602-606 for an audio signal according to an embodiment of the subject matter described herein. For example, delay circuits 602-606 may be implemented using FPGAs, ASICs, and/or other hardware. In this example, each of delay circuits 602-606 may be associated with delaying an audio signal for a particular column of transducers.

In some embodiments, each of delay circuits 602-606 may include a clock and/or another component for delaying the signal output by a particular time amount. In some embodiments, each of delay circuits 602-606 may delay a signal by about the same amount. In some embodiments, each of delay circuits 602-606 may delay signals by different amounts depending on the required sound beam.

For example, based on a detected location of a pedestrian, controller module 102 may determine that delay circuit 602 for a column 'b' of transducers should delay outputting or emitting an audio signal by 0.2 milliseconds from when a column 'a' of transducers outputs or emits the same audio signal. In this example, controller module 102 may also determine that delay circuit 604 for a column 'c' of transducers should delay outputting or emitting an audio signal by 0.2 milliseconds from when column 'b' of transducers outputs or emitted the audio signal. Continuing with this example, controller module 102 may also determine that delay circuit 606 for a column 'd' of transducers should delay outputting or emitting an audio signal by 0.2 milliseconds from when column 'c' of transducers outputs or emitted the audio signal.

In another example, based on a detected location and a changing speed of a pedestrian, controller module 102 may determine that delay circuit 602 for a column 'b' of transducers should delay outputting or emitting an audio signal by 0.2 milliseconds from when a column 'a' of transducers outputs or emits the same audio signal. In this example, controller module 102 may also determine that delay circuit 604 for a column 'c' of transducers should delay outputting or emitting an audio signal by 0.3 milliseconds from when column 'b' of transducers outputs or emitted the audio signal. Continuing with this example, controller module 102 may also determine that delay circuit 606 for a column 'd' of transducers should delay outputting or emitting an audio signal by 0.4 milliseconds from when column 'c' of transducers outputs or emitted the audio signal.

Figure 7:
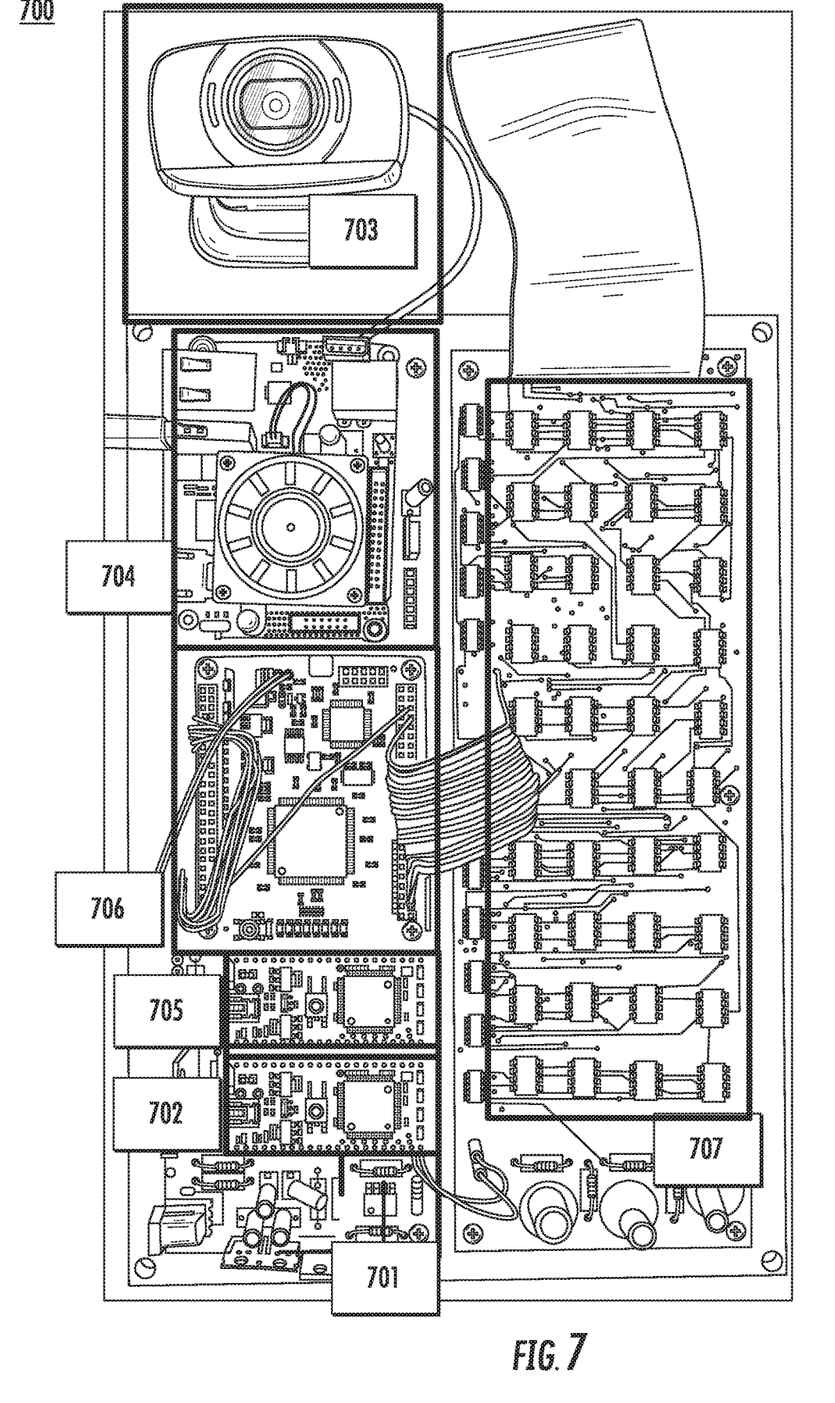
FIG. 7 is a diagram illustrating various components of a phase array directed speaker system according to an embodiment of the subject matter described herein.

FIG. 7 is a diagram illustrating various components of a phase array directed speaker system 700 according to an embodiment of the subject matter described herein. In some embodiments, system 700 may include a communications interface 701, a modulator 702, a camera 703, a detection system 704, a converter 705, a signal processor 706, an amplifier 707, and ultrasonic transducers (not shown in FIG. 7).

In some embodiments, communications interface 701 may represent any suitable entity (e.g., a sound processing card) for receiving an audio signal (e.g., a recording of a siren or a voice warning of approaching traffic). In some embodiments, communications interface 701 may also include filtering and/or processing functionality for removing or converting various frequencies and/or distortions in a received audio signal.

In some embodiments, modulator 702 may represent any suitable entity (e.g., an ARM microcontroller or hardware combined with software) for encoding an audio signal into a pulsing signal. For example, modulator 702 may use pulse-width modulation to encode an audio signal (e.g., a recorded digital warning message or a beeping sound) at 40 kHz.

In some embodiments, camera 703 may represent any suitable entity for observing visual and/or audio information about an environment. For example, camera 703 may provide a video stream depicting pedestrians and/or traffic to detection system 704 for processing.

Detection system 704 may represent any suitable entity (e.g., a computer built on a single circuit board or hardware combined with software) for detecting faces in video data from camera 703 and for detecting an output angle usable when directing or shifting sound using phase array 704. For example, detection system 704 may analyze pixels of various video frames to detect a pedestrian's face, walking speed, and direction traveled and may use this information when determining how much to adjust a sound beam such that a warning or other audio is heard by the pedestrian.

In some embodiments, converter 705 may represent any suitable entity (e.g., an ARM microcontroller or hardware combined with software) for converting information from detection system 704 into digital select signals and/or information for instructing phase array 104 to generate directed sound. For example, converter 705 may determine digital select signals which will indicate how a sound beam is angled and/or how much an audio signal is delayed between columns of speakers in phase array 104.

In some embodiments, signal processor 706 may represent any suitable entity (e.g., at least one FPGA or hardware combined with software) for splitting an input signal into multiple channels. For example, signal processor 706 may split an input audio signal into channels, where each channel is for a column of speakers (e.g., ultrasonic transducers) in phase array 104. In this example, signal processor 706 may also use information from converter 705 for determining time delays between each column of speakers in phase array such that a sound beam can be directed to an appropriate target 204.

In some embodiments, amplifier 707 may represent any suitable entity for amplifying an audio signal before being emitted by speakers or ultrasonic transducers. For example, amplifier 707 may amplify an audio signal emitted by phase array 104 such that the audio signal is received by a pedestrian or other target 204 at sufficient volume.

It will be appreciated that FIG. 7 is for illustrative purposes and that various nodes, their locations, and/or their functions may be changed, altered, added, or removed. For example, some nodes and/or functions (e.g., components 701-705) may be combined into a single entity (e.g., controller module 102). In another example, components 706-707 and ultrasonic transducers described above may be combined into phase array 104. In another example, a node and/or function may be located at or implemented by two or more nodes.

Figure 8:
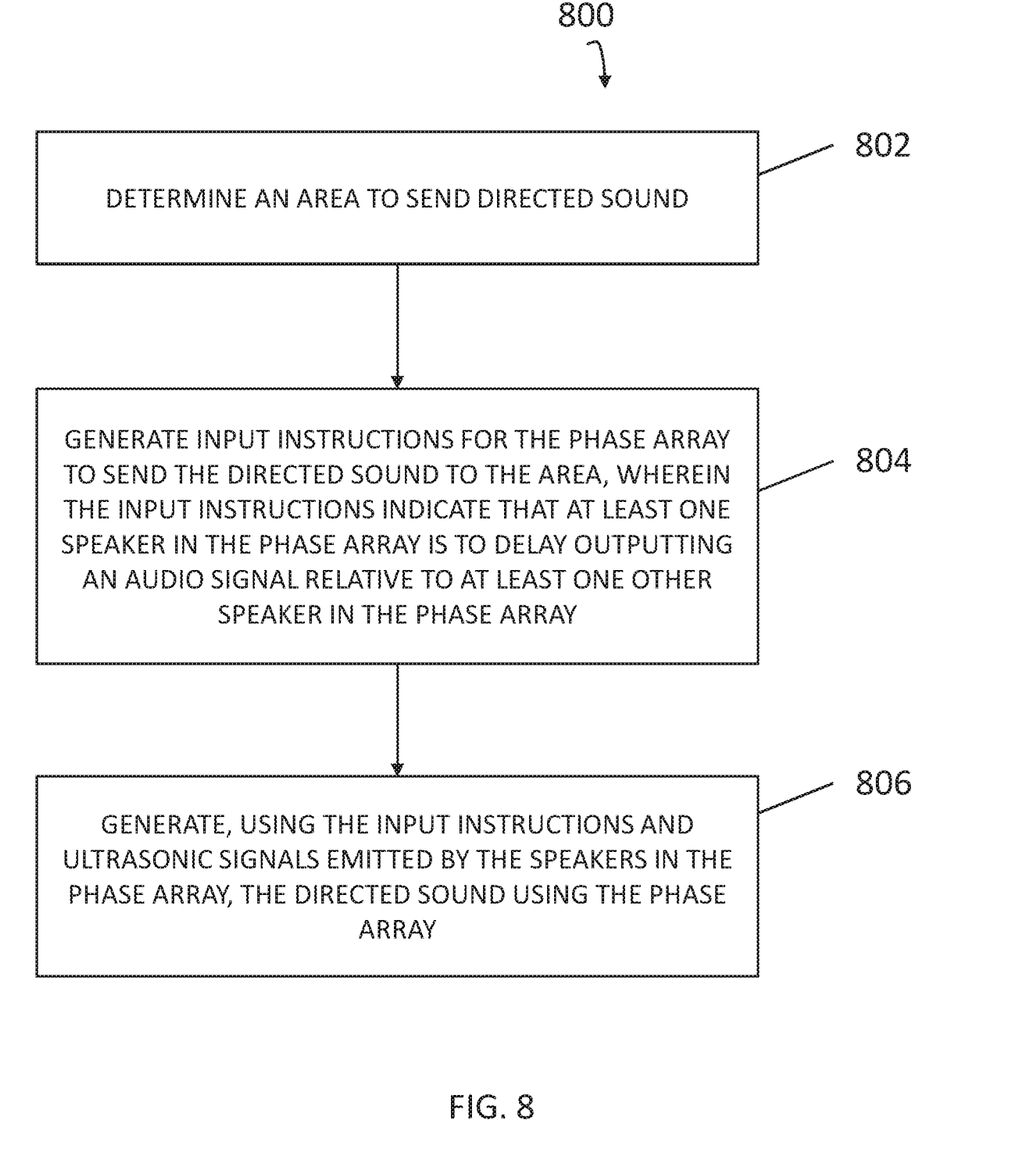
FIG. 8 is a flow chart illustrating a process for generating directed sound according to an embodiment of the subject matter described herein.

FIG. 8 is a flow chart illustrating a process 800 for generating directed sound according to an embodiment of the subject matter described herein. In some embodiments, process 800, or portions thereof, may be performed by or at controller module 102, phase array 104, one or more of components 701-707, or systems 100, 200, and/or 700.

Referring to FIG. 8, at step 802, an area to send directed sound may be determined.

At step 804, input instructions for a phase array to send the directed sound to the area may be generated. In some embodiments, input instructions may indicate that at least one speaker in phase array 104 is to delay outputting an audio signal relative to at least one other speaker in phase array 104.

At step 806, the directed sound may be generated by the phase array using the input instructions and ultrasonic signals emitted by the speakers in the phase array.

In some embodiments, at least one sensor may include camera 703, a computer vision system, a laser rangefinder system, or a sonar detection system.

In some embodiments, generating input instructions may be performed by a controller (e.g., controller module 102), at least one processor, and/or at least one FPGA.

In some embodiments, phase array 104 may emit ultrasonic signals.

In some embodiments, target 204 may be a pedestrian, an automobile, or a computer system. For example, system 200 may send an audio signal to a person crossing the street, a car about to enter an intersection, or to a computerized and/or warning system-aware stoplight.

In some embodiments, input instructions for phase array 104 may be updated as location information about target 204 changes so as to adjust the directed sound while target 204 is moving.

In some embodiments, speakers in phase array 104 are arranged into multiple columns.

In some embodiments, generating directed sound may include using time delays (e.g., phase delays) between adjacent columns of speakers.

In some embodiments, directed sound may be less audible outside of an area designated to receive the directed sound. For example, a shape of directed sound may be such that the volume for the directed sound is focused or localized, e.g., relative to sound emitted from a non-parametric speaker.

Figure 9:
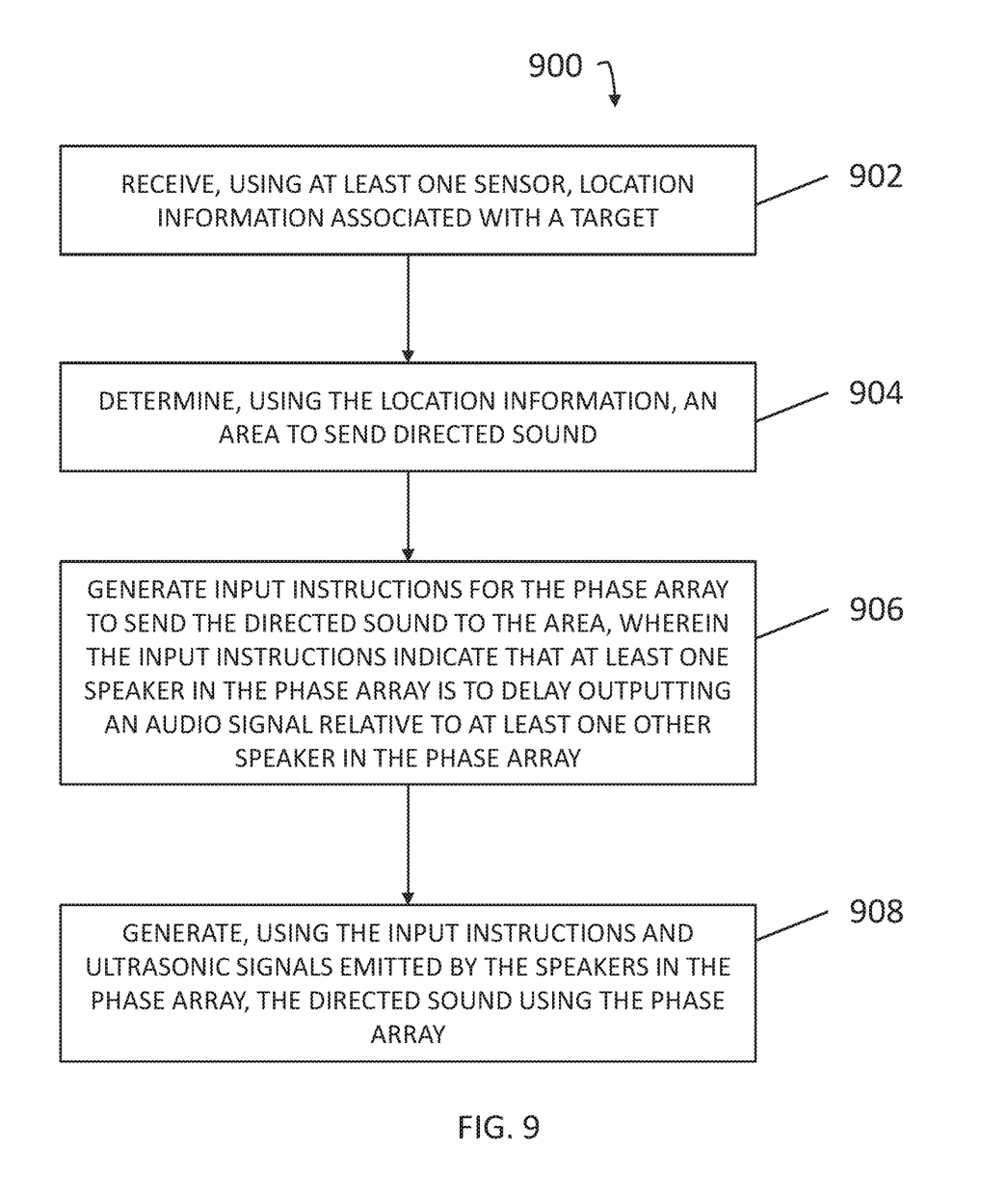
FIG. 9 is a flow chart illustrating a process for generating directed sound according to another embodiment of the subject matter described herein.

FIG. 9 is a flow chart illustrating a process 900 for generating directed sound according to another embodiment of the subject matter described herein. In some embodiments, process 900, or portions thereof, may be performed by or at controller module 102, phase array 104, one or more of components 701-707, or systems 100, 200, and/or 700.

Referring to FIG. 9, at step 902, location information associated with a target (e.g., information related to location, speed, and/or direction of a pedestrian) may be received using at least one sensor 202.

At step 904, an area to send directed sound may be determined using the location information associated with a target.

At step 906, input instructions for a phase array to send the directed sound to the area may be generated. In some embodiments, input instructions may indicate that at least one speaker in phase array 104 is to delay outputting an audio signal relative to at least one other speaker in phase array 104.

At step 908, the directed sound may be generated by the phase array using the input instructions and ultrasonic signals emitted by the speakers in the phase array.

In some embodiments, at least one sensor may include camera 703, a computer vision system, a laser rangefinder system, or a sonar detection system.

In some embodiments, generating input instructions may be performed by a controller (e.g., controller module 102), at least one processor, and/or at least one field programmable gate array.

In some embodiments, phase array 104 may emit ultrasonic signals.

In some embodiments, target 204 may be a pedestrian, an automobile, or a computer system. For example, system 200 may send an audio signal to a person crossing the street, a car about to enter the intersection, or to a computerized and/or warning system-aware stoplight.

In some embodiments, input instructions for phase array 104 may be updated as location information about target 204 changes so as to adjust the directed sound while target 204 is moving.

In some embodiments, speakers in phase array 104 are arranged into multiple columns.

In some embodiments, generating directed sound may include using time delays (e.g., phase delays) between adjacent columns of speakers.

In some embodiments, directed sound may be less audible outside of an area designated to receive the directed sound.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for generating directed sound, the system comprising:
   at least one sensor configured to obtain location information associated with a target;
   a controller configured to determine, using the location information, an area to send directed sound and to generate input instructions for a phase array to send directed sound to the area, wherein the input instructions indicate that at least one speaker in the phase array is to delay outputting an audio signal relative to at least one other speaker in the phase array; and
   the phase array comprising speakers for emitting ultrasonic signals, wherein the phase array is configured to generate, using the input instructions and the ultrasonic signals, the directed sound, wherein the speakers in the phase array are arranged in columns, wherein the columns of speakers in the phase array are spaced at an integer multiple of the emission wavelength, wherein the integer is greater than one, wherein the ultrasonic signals are generated by splitting an input audio signal into multiple channels, wherein each channel is associated with one of the columns, wherein the phase array generates directed sound by using different time delays between different adjacent columns of speakers, wherein the directed sound is audible to humans and has a frequency range between about 20 Hz and about 20 kHz.

2. The system of claim 1 wherein the at least one sensor includes a camera, a computer vision system, a laser rangefinder system, or a sonar detection system.

3. The system of claim 1 wherein the controller includes at least one processor or at least one field programmable gate arrays.

4. The system of claim 1 wherein the target is a pedestrian, an automobile, or a computer system.

5. The system of claim 1 wherein the controller updates the input instructions as the location information changes so as to adjust the directed sound while the target is moving.

6. The system of claim 1 wherein the directed sound is less audible outside of the area designated to receive the directed sound.

7. A system for generating directed sound, the system comprising:
   a controller configured to determine an area to send directed sound and to generate input instructions for a phase array to send directed sound to the area, wherein the input instructions indicate that at least one speaker in the phase array is to delay outputting an audio signal relative to at least one other speaker in the phase array; and
   the phase array comprising speakers for emitting ultrasonic signals, wherein the phase array is configured to generate, using the input instructions and the ultrasonic signals, the directed sound, wherein the speakers in the phase array are arranged in columns, wherein the columns of speakers in the phase array are spaced at an integer multiple of the emission wavelength, wherein the integer is greater than one, wherein the ultrasonic signals are generated by splitting an input audio signal into multiple channels, wherein each channel is associated with one of the columns, wherein the phase array generates directed sound by using different time delays between different adjacent columns of speakers, wherein the directed sound is audible to humans and has a frequency range between about 20 Hz and about 20 kHz.

8. A method for generating directed sound, the method comprising:
   receiving, using at least one sensor, location information associated with a target;
   determining, using the location information, an area to send directed sound;
   generating input instructions for a phase array to send the directed sound to the area, wherein the input instructions indicate that at least one speaker in the phase array is to delay outputting an audio signal relative to at least one other speaker in the phase array; and
   generating, using the input instructions and ultrasonic signals emitted by the speakers in the phase array, the directed sound using the phase array, wherein the speakers in the phase array are arranged in columns, wherein the ultrasonic signals are generated by splitting an input audio signal into multiple channels, wherein the columns of speakers in the phase array are spaced at an integer multiple of the emission wavelength, wherein the integer is greater than one, wherein each channel is associated with one of the columns, wherein the phase array generates directed sound by using different time delays between different adjacent columns of speakers, wherein the directed sound is audible to humans and has a frequency range between about 20 Hz and about 20 kHz.

9. The method of claim 8 wherein the at least one sensor includes a camera, a computer vision system, a laser rangefinder system, or a sonar detection system.

10. The method of claim 8 wherein generating the input instructions is performed by a controller, at least one processor, or at least one field programmable gate array.

11. The method of claim 8 wherein the target is a pedestrian, an automobile, or a computer system.

12. The method of claim 8 comprising:
    updating the input instructions as the location information changes so as to adjust the directed sound while the target is moving.

13. The method of claim 8 wherein the directed sound is less audible outside of the area designated to receive the directed sound.

14. A method for generating directed sound, the method comprising:
    determining an area to send directed sound;
    generating input instructions for a phase array to send the directed sound to the area, wherein the input instructions indicate that at least one speaker in the phase array is to delay outputting an audio signal relative to at least one other speaker in the phase array; and
    generating, using the input instructions and ultrasonic signals emitted by the speakers in the phase array, the directed sound using the phase array, wherein the speakers in the phase array are arranged in columns, wherein the columns of speakers in the phase array are spaced at an integer multiple of the emission wavelength, wherein the integer is greater than one, wherein the ultrasonic signals are generated by splitting an input audio signal into multiple channels, wherein each channel is associated with one of the columns, wherein the phase array generates directed sound by using different time delays between different adjacent columns of speakers, wherein the directed sound is audible to humans and has a frequency range between about 20 Hz and about 20 kHz.

15. A non-transitory computer readable medium having stored thereon executable instructions that when executed by at least one processor of a computer causes a computer to perform steps comprising:

receiving, using at least one sensor, location information associated with a target;

determining, using the location information, an area to send directed sound;

generating input instructions for a phase array to send the directed sound to the area, wherein the input instructions indicate that at least one speaker in the phase array is to delay outputting an audio signal relative to at least one other speaker in the phase array; and generating, using the input instructions and ultrasonic signals emitted by the speakers in the phase array, the directed sound using the phase array, wherein the speakers in the phase array are arranged in columns, wherein the columns of speakers in the phase array are spaced at an integer multiple of the emission wavelength, wherein the integer is greater than one, wherein the ultrasonic signals are generated by splitting an input audio signal into multiple channels, wherein each channel is associated with one of the columns, wherein the phase array generates directed sound by using different time delays between different adjacent columns of speakers, wherein the directed sound is audible to humans and has a frequency range between about 20 Hz and about 20 kHz.

16. A non-transitory computer readable medium having stored thereon executable instructions that when executed by at least one processor of a computer causes a computer to perform steps comprising:

determining an area to send directed sound;

generating input instructions for a phase array to send the directed sound to the area, wherein the input instructions indicate that at least one speaker in the phase array is to delay outputting an audio signal relative to at least one other speaker in the phase array; and generating, using the input instructions and ultrasonic signals emitted by the speakers in the phase array, the directed sound using the phase array, wherein the speakers in the phase array are arranged in columns, wherein the columns of speakers in the phase array are spaced at an integer multiple of the emission wavelength, wherein the integer is greater than one, wherein the ultrasonic signals are generated by splitting an input audio signal into multiple channels, wherein each channel is associated with one of the columns, wherein the phase array generates directed sound by using different time delays between different adjacent columns of speakers, wherein the directed sound is audible to humans and has a frequency range between about 20 Hz and about 20 kHz.

* * * * *